June 16, 1931.   W. S. TOWNSEND   1,810,151
LIQUID DISPENSING APPARATUS
Filed Feb. 4, 1928   4 Sheets-Sheet 2
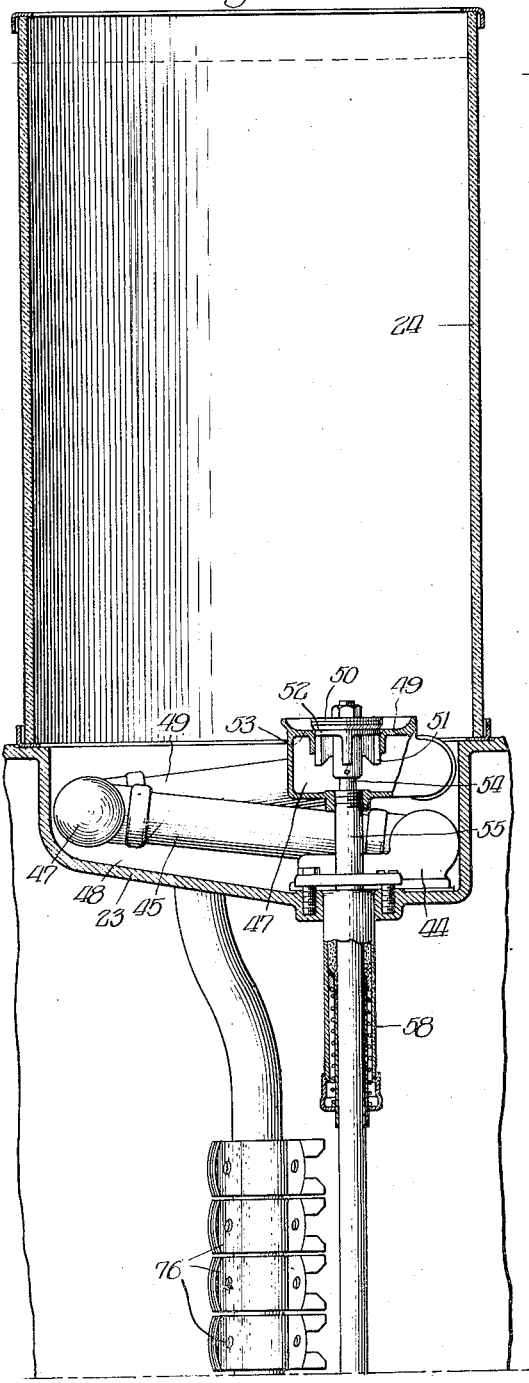
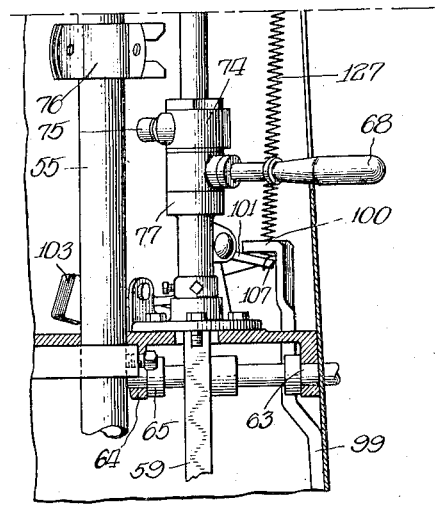
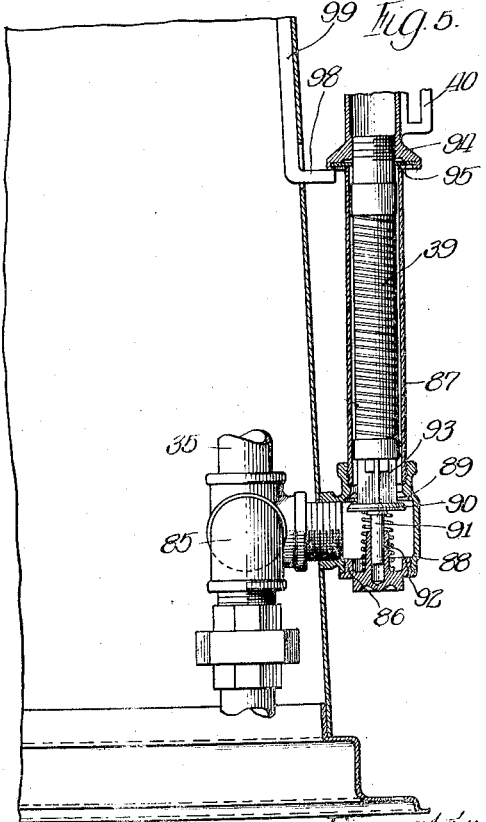

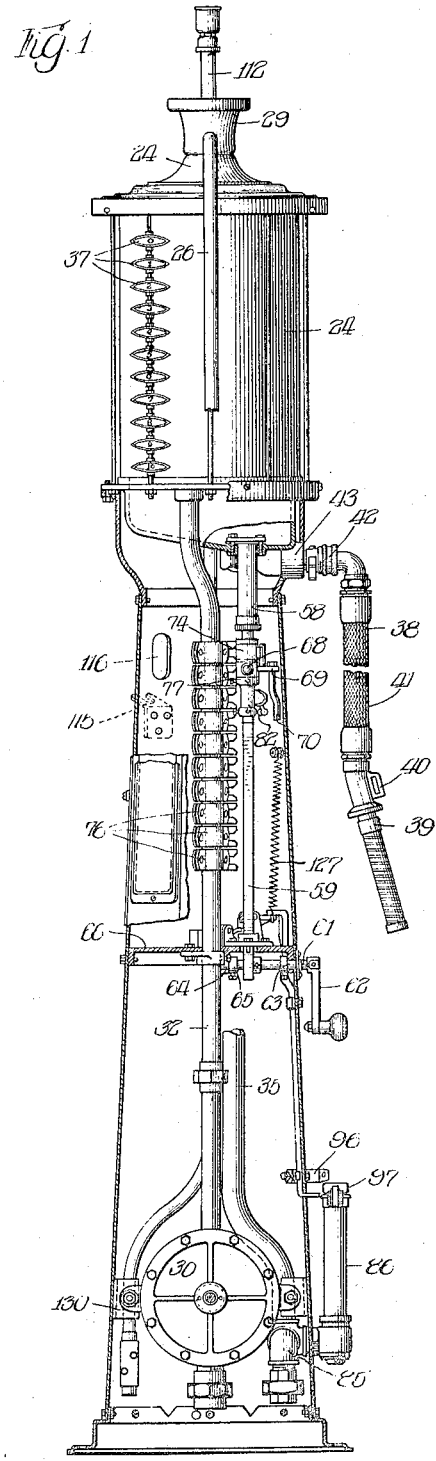
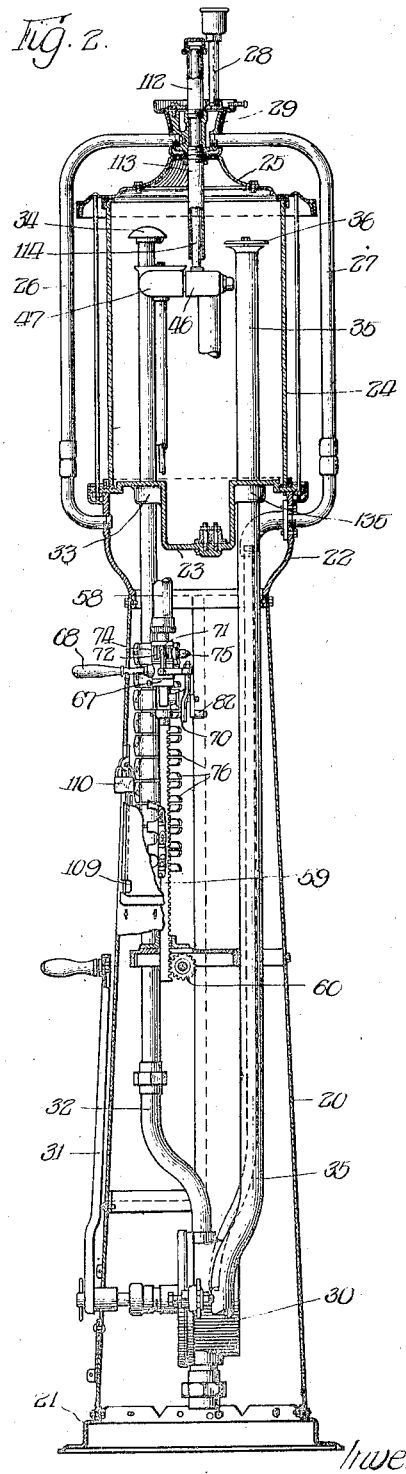

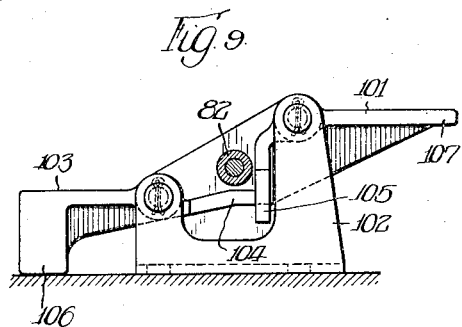
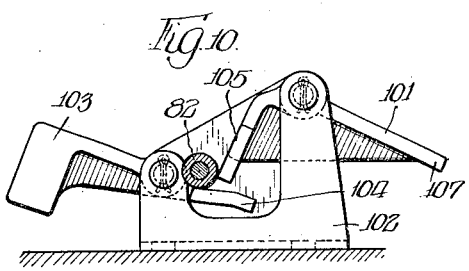
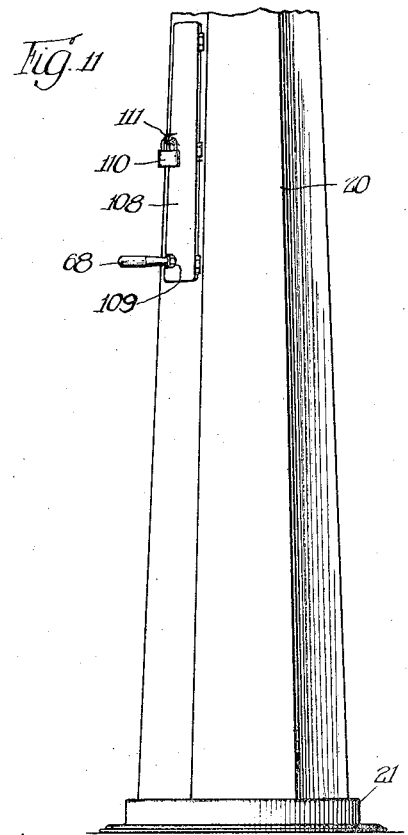
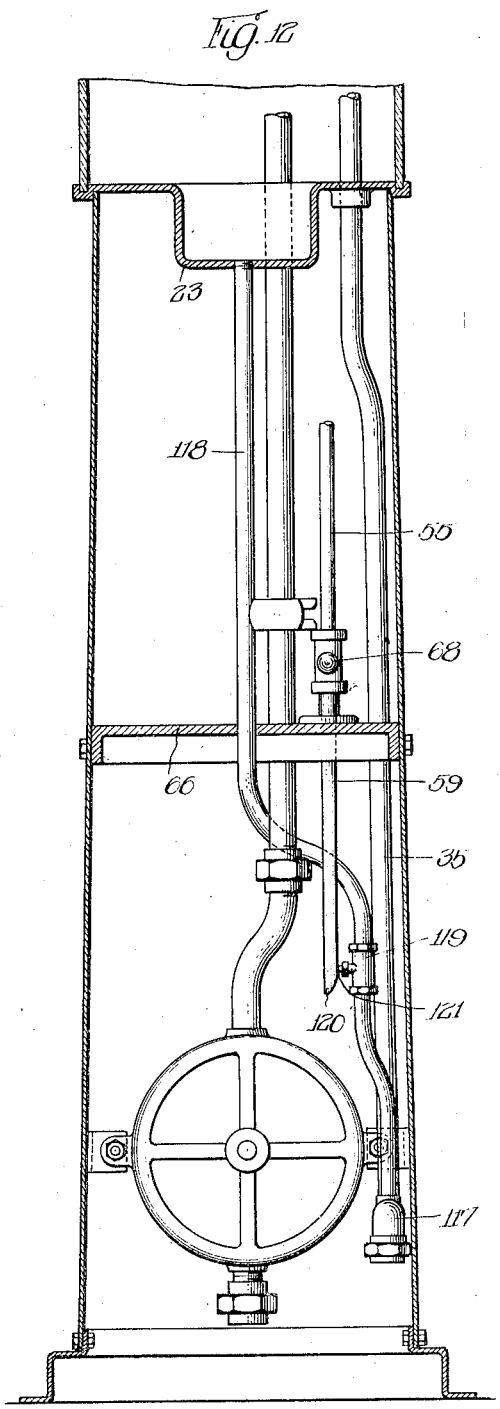

Patented June 16, 1931

1,810,151

UNITED STATES PATENT OFFICE

WILLIAM S. TOWNSEND, OF ROCHESTER, PENNSYLVANIA, ASSIGNOR, BY MESNE ASSIGNMENTS, TO THE WAYNE COMPANY, OF BALTIMORE, MARYLAND, A CORPORATION OF MARYLAND

LIQUID DISPENSING APPARATUS

Application filed February 4, 1928. Serial No. 251,982.

This invention pertains to liquid dispensing apparatus, and more particularly to liquid dispensing pumps of the visible and progressive type.

In pumps now in use, it is not unusual to provide a visible measuring chamber in which there is disposed a movable measuring and delivering pipe which is adapted to have either a motion of rotation or translation, or a combination of the two, for setting the pipe for delivery of only a predetermined amount of liquid, the liquid being delivered to a delivery hose through a valve provided on the outside of the pump and operated at said valve.

With this type of pump, objection has been raised in that successive amounts of liquid cannot be accurately delivered, any delivery that may be made being only by eye and hand measure. Further, with the pumps now in general use, the operation must necessarily take place at a plurality of points at different times, making it necessary for the attendant to travel from one point to another in order to effect filling, measuring insertion of the hose for delivery, and finally, for delivery, and as is readily appreciated, this is objectionable in the time lost and the chances of error in setting the pump for delivery of successive amounts of liquid. Not only that, but with these pumps great difficulty is encountered in what is known as the "wet hose evil". It is not desirable or safe to have liquid dripping from the nozzle, and also under certain regulations when the pump is in inoperative position, as when it is closed for any length of time, the measuring chamber must be empty, and it is of course desirable and oftentimes imperative that the working parts be in locked position so that the pump may not be tampered with.

It is therefore an object of this invention to provide a device for dispensing liquid accurately, quickly and in such a manner as to prevent the wet hose evil.

A further object is to provide a readily operable and controllable liquid dispensing apparatus which may be set in liquid discharging position and discharged by a minimum of operations.

A still further object is to provide a liquid dispensing apparatus having drain back means operable to remove the liquid from the measuring chamber to the source of supply only when the device is in inoperative position.

Another object is to provide a progressive measurement pump having a movable discharged element adapted to be positioned at predetermined positions of discharge, and parts associated therewith permitting accurate filling of the measuring chamber regardless of the position of the discharge element.

Still another object is to provide a device for dispensing liquid having the operating parts so disposed that they may be sealed in inoperative position only under predetermined conditions.

Yet another object is to provide a liquid dispensing apparatus which is inexpensive to make, has a minimum of operating parts, is progressive in operation, and fulfills all requirements of manufacture and service.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a sectional elevation of the liquid dispensing apparatus, certain parts being shown in such position as to discharge one unit; the pump shown by way of illustration being one of the ten unit type;

Figure 2 is a sectional elevation similar to Figure 1, taken substantially at right angles to Figure 1;

Figure 3 is an enlarged sectional elevation of the measuring chamber, valve discharge, and associated mechanism, showing the deflector cup in lowered or drain position;

Figure 4 is an enlarged fragmentary sectional elevation, showing the position of locking and tripping mechanism when the pump is in drained position;

Figure 5 is an enlarged fragmentary sectional elevation, showing the position of the drain mechanism and nozzle in drain position, the same corresponding to the position of the parts illustrated in Figure 4;

Figure 9 is an elevation of the locking lever device of the drain, showing the same in locked position;

Figure 10 is an elevation of the locking lever device of the drain, showing the same in released position;

Figure 11 is a fragmentary elevation showing the relation of the quantity lever and the casing or standard door when the door is in locked position; and, Figure 12 is an enlarged fragmentary vertical sectional elevation illustrating a modified form of drain for the measuring chamber.

Figure 6:
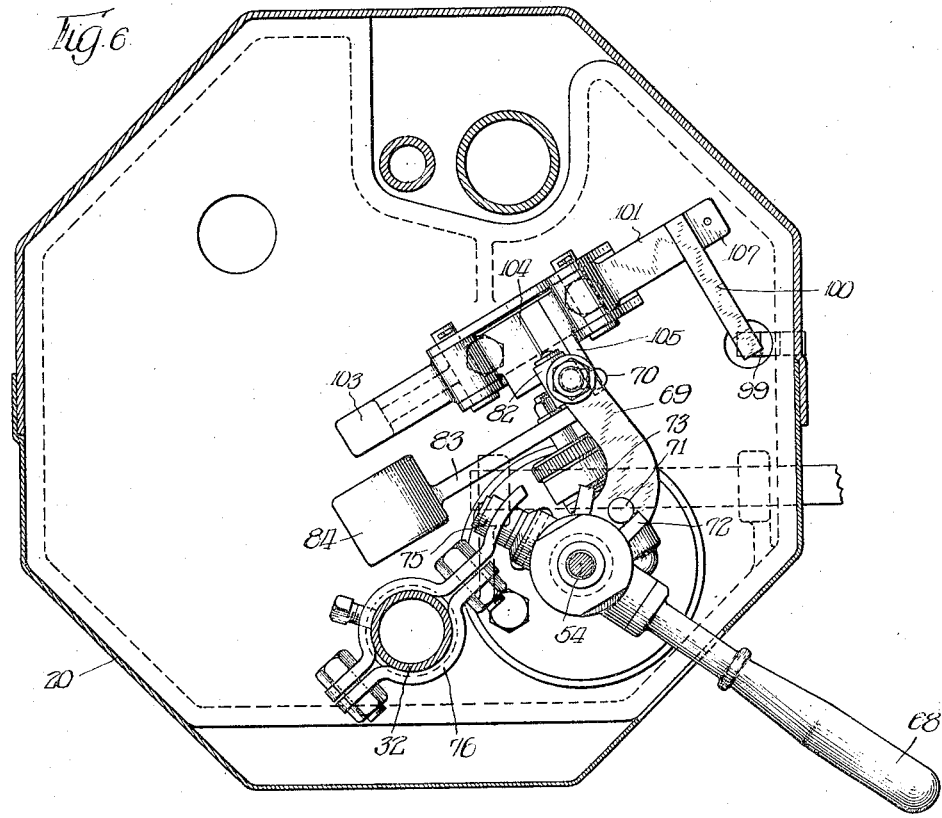
Figure 6 is an enlarged sectional plan of certain of the valve control mechanism in amount determining position prior to discharge.

The liquid dispensing apparatus consists essentially of a standard or support 20 disposed on and secured to a base portion 21, the upper portion of the standard carrying a shoulder fitting 22 to which is secured the drain casting 23, in turn supporting in liquid tight relation the measuring chamber cylinder 24 of the visible type. The measuring chamber cylinder 24 is provided with a top assembly 25 having the usual stabilizing conduits 26 and 27, air balance 28 and indicia dome carying support 29, all being held in assembled position by means of tie rods or the like. The device is of course provided with and supports, as by the brackets 130, any usual form of pump, such as the oscillating hand pump 30 operated by means of lever 31 for filling the measuring chamber 24 through pipe line or conduit 32, said pipe line extending through a suitable stuffing box 33 and into the measuring chamber above the zero measuring mark, the conduit being preferably provided with a cap or deflector 34. The liquid which may be pumped into the cylinder is stabilized and the level determined by means of the overflow conduit 35 provided with a drain cap 36 so constructed as to prevent capillary action influencing the liquid level, the opening therein being so arranged as to level the liquid in the chamber at the zero mark, the conduit 35 of course leading back through stuffing box 135 in the casting 23 to the storage tank or source of supply (not shown).

Level indicating markers 37 are conveniently arranged either on the inside or outside of the measuring chamber and are calibrated so as to read the number of units which have been discharged from the top down.

Discharge from the measuring chamber is of course effected through the hose assembly 38, said assembly being provided with a nozzle 39 of the rigid, semi-rigid or flexible type, said nozzle being provided with a locking eye or member 40. The flexible hose 41 is connected to a fitting 42 so as to give a substantially universal movement, said fitting terminating in a portion 43 communicating with a valve discharge fitting 44 mounted in the drain casting 23. A collapsible arm 45 communicates with and is pivoted to the casting 44 and to a fitting 46 communicating with and secured to the deflector valve assembly 47. The collapsible arm consists essentially of a pair of members 48 and 49 pivoted respectively to the castings 44 and 46 and to each other, as at 47, in such a manner that communication is maintained unobstructed throughout.

The deflector assembly consists essentially of a cup 49 provided with a deflector valve 50, the said valve being preferably provided with four guiding ribs 51 supporting a cork disc 52, insuring a tight seal between the valve disc and the valve seat 53. The valve is actuated by means of a rod 54 preferably attached thereto and extending through the deflector cup and through a stuffing box into and through a hollow rod 55 attached to the deflector cup, and down to a point adjacent lever 56 movable to operate the valve. The valve of course may be seated by gravity, but preferably a spring (not shown) is provided cooperating with the rod 54 in such a manner as to tend always to seat the valve disc. Rod 55 serves as the means by which the deflector valve assembly is moved, extends through a suitable stuffing box or gland 58 provided in the casting 23, and terminates in a rack 59 which meshes with a pinion 60 secured to an operating shaft 61 adapted to be rotated by a handle 62, the shaft 61 being preferably carried by bearings 63 and 64 and positioned by collars 65 to shelf 66 provided in the casing.

Quantity selecting and valve operating mechanism 67 is also carried by the rod 55 and may take the form of a quantity handle 68 loosely pivoted to the rod 55, the same being provided with an extension 69 carrying depending finger 70 and an upwardly extending lug or pin 71. The lug or pin 71 is adapted to have selected contact with lugs 72 and 73 on the loosely mounted collar member 74, said member carrying a roller 75 extending in an opposite direction from the handle 68 and adapted to enter the slots or notches in the measuring finger 76, said fingers being of any convenient shape and preferably secured to the inlet conduit 32 for a matter of convenience of assembly and operation.

Figures 7, 8:
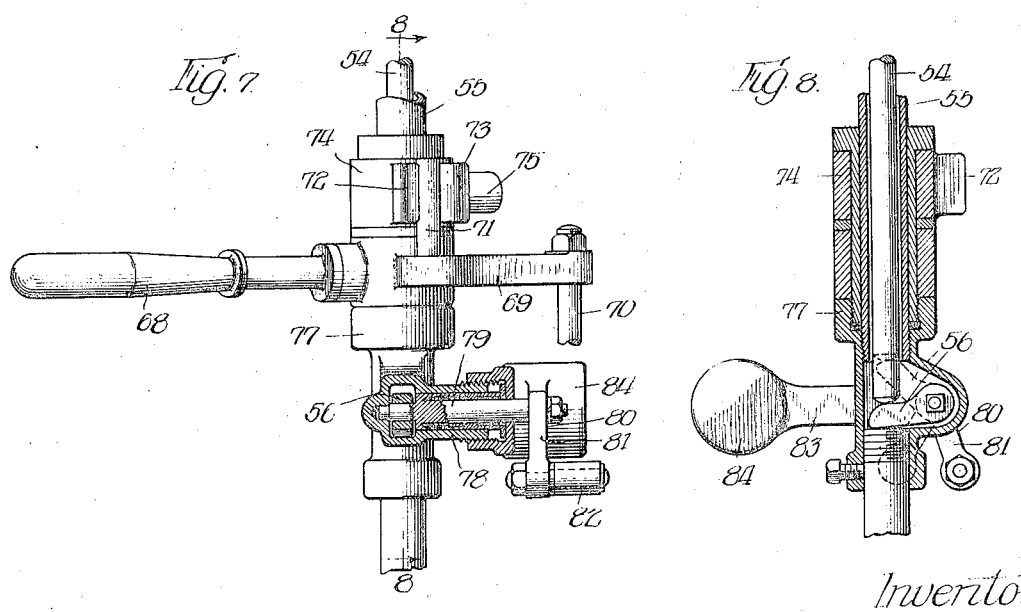
Figure 7 is an enlarged fragmentary elevation of the quantity lever and associated valve operating mechanism.
Figure 8 is an enlarged sectional elevation taken substantially in the plane as indicated by the line 8—8 of Figure 7, dotted positions of certain of the parts indicating valve open position.

Rigidly connected to the pipe 55 and below and forming a bearing for the collar portion of the quantity lever 68 is a valve operating fitting 77. Said fitting provides a suitable bearing 78 for a horizontal shaft 79, to the inside of which is fixed the arm 56, said arm having contact with the end of the rod 54. To the outer end of the shaft 79 there is fixed a bellcrank 80, one leg 81 of which is in a plane substantially at right angles to that of the arm 56, in effect forming a bellcrank therewith, and carries an outwardly extending roller pin 82, the other leg 83 of the bellcrank 80 being provided with a weight 84, or its equivalent, (as a spring connection), for the purpose of maintaining the finger 56 in lowered position, and consequently the valve 50 in closed position, as illustrated in Figures 3 and 8. It will be noticed that the depending finger 70 is of such length that it may be moved in contact with the roller pin 82 for operation of the bellcranks for moving the valve 50 to open position.

The return drain 35 adjacent the bottom of the standard may be provided with a fitting 85 providing communication with a drain device 86 exposed on the outside of the casing. This device consists of a nozzle receiving nipple 87 terminating in and secured to, as by threaded engagement, the valve housing 88. Said housing is provided with a valve seat 89 normally closed by a spring-pressed poppet valve 90, the same being provided with a guiding stem 91 having cooperative engagement with a guide 92 in the housing, the valve disc of the poppet valve being provided with an upwardly extending portion 93, which may be in the form of fins, and so proportioned that when the valve is forced to open position by the nozzle 39, the shoulders 94 of the nozzle are in nipple contacting position, said shoulders being preferably provided with cork or other insulation 95 for the purpose of forming an airtight seal with the nipple in the drain position.

In drain position, the nozzle may be locked through the member 40, a seal being passed through said member and a corresponding member 96 carried by the standard, or member 40 may be so proportioned as to straddle member 96, in which case a seal or lock may be positioned to prevent disengagement of said members. The nipple of course may be provided with a cover 97 pivoted or mounted in such a way as to be readily moved out of position when it is desired to insert the nozzle in drain back position.

In valve depressed position, the shoulder 94 contacts with an outward extension 98 of a locking bar 99 contained in and carried by the standard, the bar extending upward and provided with an extension 100, which extension under certain conditions is adapted to have contact with and move a bellcrank 101 in clockwise motion. This bellcrank may conveniently be pivoted to a support 102 secured to and carried by the shelf 66, said support also carrying a weighted bellcrank or locking member 103 pivoted thereto and having one leg 104 adapted to normally engage leg 105 of the bellcrank 101 (Figure 9) to prevent motion of said bellcrank, the counterweight 106 normally maintaining bellcrank 103 in locking position. A spring 127 may be disposed between and attached to leg 107 of bellcrank 101 and a portion of the standard, tending to maintain said bellcrank in the position shown in Figure 9.

It will be noticed that when the quantity lever 68 is in a position corresponding to the lower stop 76; that is, for discharging the full ten units in this case, the valve assembly 47 is not in its lowermost position, and the door 108 provided with a notch 109 through which the lever 68 extends in locked position, cannot be closed as the handle 68 is some distance above the notch 109, and consequently, the lock 110 cannot be applied to the locking lugs 111 provided on the door and standard. It is necessary, therefore, to release the quantity lever assembly from said last stop and lower the same until the lever 68 is in the position as illustrated in Figure 4, in which position it may be revolved in clockwise direction horizontally into such a position where the door 108 may be closed and locked.

In pumps of the progressive type, it is generally true that it is impossible to correctly determine amounts of liquid in the measuring chamber unless the valve assembly 47 has first been raised upwardly to its topmost or the zero position. This is of course due to the fact that as the tube 55 has a variable amount disposed within the measuring chamber for various positions of the valve assembly, variable amounts of liquid are displaced so that a proper calibration cannot be made under all conditions.

In this device, therefore, it has been found highly desirable to provide a top assembly with sleeve members 112 and 113 communicating through the fitting 29 and into the measuring chamber, it, of course, being understood that the upper fitting 112 is not visible due to the fact that an advertising illuminating or indicating insignia of some sort is carried by the fitting 29. A slidable member 114 is then secured to the deflector device or the casting 46, and is adapted to have sliding engagement in the sleeves 112 and 113, said tube 114 being of such proportions as to displace the same amount of liquid as the tube 55, and of course, is of such length as to never be withdrawn below the overflowing opening of the fitting 36 and overflow pipe 35.

In the operation of this form of the apparatus, when the pump is in night locked position, the nozzle 39 will of course be in the nipple 87 as illustrated in Figure 5, and the quantity lever 68 will of course be locked in position as illustrated in Figure 11. It is therefore necessary to release these parts, the nozzle in normal position being retained on a hook 115 provided adjacent an aperture 116 provided in the standard, the end of the nozzle of which may extend through said aperture to prevent dripping of said nozzle. It is then possible to move the quantity lever upward by revolving the crank 62, the pinion 60 then acting to move the rack 59 upwardly to the desired position, and the measuring chamber may be filled by actuation of the pump 30.

If then, for example, it is desired to discharge five units, it is only necessary to move the quantity lever 68 to the corresponding measuring finger 76. The lever 68 is then revolved in a counterclockwise direction horizontally, the pin 71 engaging with lug 73 to revolve the roller 75 into a position where it just enters the finger 76, as indicated in Figure 6. In this position, of course, the valve 50 is closed and no liquid is discharged. The nozzle of the hose of course may then be inserted in a tank or receptacle which is to be charged, and to open the valve 50, it is only necessary to continue movement of the lever 68 in a counterclockwise position, moving the roller 75 farther into the notch of its measuring finger 76. This continued movement causes the depending finger 70 to engage the roller finger 82, imparting clockwise motion to the finger 56, raising said finger upwardly, causing movement upwardly of the rod 54, which in turn raises the valve 50, permitting the liquid to flow through the deflector cup 47, collapsible arms 45, fitting 44, fitting 43 and hose assembly 38, to the point of delivery.

If then additional amounts are desired to be discharged, it is only necessary to move the lever 68 in a clockwise direction, the first movement causing closing the valve 50 in reverse movement from that already described, though springs or gravity action, continued movement causing contact between finger 71 and lug 72, revolving the roller 75 out of its measuring finger, whereupon it is possible to lower the lever 68 to the desired notch whereby repetition of operation of the lever 68 will open the valve 50 to discharge an additional amount of liquid.

When it is desired then to empty the measuring chamber and to lock the apparatus, the nozzle 39 may be inserted into the nipple 86. However, it cannot be seated in said nipple nor can it operate the valve 90 to open position because the shoulder 94 will be contacted by the extension 98 and the nozzle will be retained in raised position. It will be noticed that the extension 98 is locked in its upward position, as the position of the locking members 101 and 103 is that as illustrated in Figure 9, so that it becomes necessary to move the quantity lever 68 below the lower stop 76, in which position the roller pin 82 will contact with leg 104 of member 103, moving the same downwardly, whereupon leg 104 will be removed from out of locking position with respect to leg 105, whereby nozzle 39 may be forced downwardly into the nipple 87, and lugs 40 and 96 locked, permitting opening of the valve 90 and causing an air-tight seal between the nipple and the nozzle. When the nozzle is forced in downward position and locked through members 40 and 96, such depression will move the member 99 downwardly, causing the bellcrank 101 to move in a clockwise direction, in which direction leg 105 will contact with roller pin 82, moving lever 56 upwardly to thereby unseat the valve 50, in which case liquid is drained through the hose connection, through the drain connection, through fitting 35 back to its source, and in such position of the parts, lever 68 may be revolved in a clockwise direction and door 108 closed and locked, as indicated in Figure 11.

It may of course be desirable to eliminate the crank 62 and its cooperating actuated mechanism, the quantity handle 68 then serving as operating means. This of course may readily be effected. Or a clutch or pawl connection may be placed between the pinion 60 and the shaft, or between the handle 62 and the shaft, in which case the handles 62 or 68 may be selectively used as operating means as desired.

The operation of the various parts of the modification illustrated in Figure 12 is substantially the same as already described, the parts being identical with the exception of the return drain mechanism. In this case, no external drain is provided, the drain pipe 35 being provided with a T-fitting 117 in place of the drain fitting 85, and a pipe 118 extends from the lowest point of the casting 23 to said fitting 117, and a normally closed valve 119, as a pin valve, is provided in said fitting for preventing liquid from normally flowing through the pipe 118 to its source. In this case then, the rack 59 is provided with a cam portion 120 adjacent its lower end, and in the position of the quantity lever corresponding to that illustrated in Figure 4; that is, in night locked position, cam 120 operates member 121 of the valve 119 to open said valve to drain the liquid of the measuring chamber back to its source, it being understood that the hose connection is suspended in any convenient position.

It is to be understood that I do not wish to be limited by the exact embodiments of the device illustrated, which are merely by way of illustration and not limitation, as various forms of the device will of course readily occur to those skilled in the art.

I claim:

1. In liquid dispensing apparatus, the combination of a measuring chamber, discharge means therefor movable to predetermined positions for gravitationally discharging predetermined amounts of liquid, means in said chamber for controlling flow from said chamber to said discharge means, and revoluble and reciprocatory means associated with said discharge means for controlling operation of said second named means.

2. In liquid dispensing apparatus, the combination of a measuring chamber, discharge means therefor movable to predetermined positions for gravitationally discharging predetermined amounts of liquid, means in said chamber for controlling flow from said chamber to said discharge means, revoluble and reciprocatory means associated with said discharge means for controlling operation of said second named means, and means for effecting reciprocation of said revoluble and reciprocatory means.

3. In liquid dispensing apparatus, the combination of a measuring chamber, a discharge connection, discharge means for said chamber having communication with said connection, said means including jointed collapsible conducting means in said chamber having a normally closed draw-off member, a remotely operated closure for said member, a control member connected to said conducting means for moving the same to predetermined positions, said member having a member therein connected to said closure, operating means carried by said control member for imparting opening and closing movement to said closure, and selecting means adapted to be positioned to maintain said conducting means in predetermined positions and adapted to be moved to control said operating means.

4. In liquid dispensing apparatus, the combination of a measuring chamber, a discharge connection, discharge means for said chamber having communication with said connection, said means including pivotal collapsible conducting means having a normally closed draw-off member, a remotely operated closure for said member, a control member connected to said conducting means for moving the same to predetermined positions, said member having a member therein connected to said closure, operating means carried by said control member for imparting opening and closing movement to said closure, and selecting means carried by said control member and adapted to be positioned to maintain said conducting means in predetermined positions and adapted to be moved to control said operating means.

5. In liquid dispensing apparatus, the combination of a measuring chamber, a discharge connection therefrom, discharge means in said chamber connected to said connection, said discharge means including collapsible conducting means and a normally closed draw-off device, a slidable member connected to said discharge means and operable remotely from said chamber, a closure for said device, operating means for said closure including a member contained in said slidable member and cooperating with said closure, an oscillating member for moving said last-named member, and a positioning member movable with and on said slidable member for positioning said discharge means in predetermined positions, said positioning member being adapted to operate said oscillating member to control said closure upon movement in excess of the positioning movement thereof.

6. In liquid dispensing apparatus, the combination of a measuring chamber, a discharge connection, discharge means for said chamber having communication with said connection, said means including collapsible conducting means having a normally closed draw-off member, a remotely operated closure for said member, a control member connected to said conducting means for moving the same to predetermined positions, said latter member having a member therein connected to said closure, operating means carried by said control member for imparting opening and closing movement to said closure, and selecting means carried by said control member and adapted to be positioned to maintain said conducting means in predetermined positions and adapted to be moved to control said operating means, means adapted to receive the end of said discharge connection, said latter means being controlled by said selecting means for permitting draining of said measuring chamber.

7. In liquid dispensing apparatus, the combination of a measuring chamber, filling and overflow means therefor, a discharge connection for said chamber, discharge means in said chamber connected to said discharge connection and movable to predetermined positions of discharge, and compensating means in said chamber associated with said discharge means whereby the chamber may be filled with a predetermined amount of liquid regardless of the position of said discharge means.

8. In liquid dispensing apparatus, the combination of a measuring chamber, filling and overflow means therefor, a discharge connection for said chamber, discharge means associated with said discharge connection, said means including collapsible conducting means and a normally closed draw-off device, a closure for said draw-off device, remotely operated slidable means associated with said discharge means and said closure for positioning said discharge means and having means for operating said closure, and slidable compensating means associated with said discharge means whereby the capacity of said chamber remains constant in filling regardless of the position of said discharge means.

9. In liquid dispensing apparatus, the combination of a measuring chamber, filling and overflow means therefor, a discharge connection for said chamber, discharge means associated with said discharge connection, said means including collapsible conducting means and a normally closed draw-off device, a closure for said draw-off device, remotely operated slidable means associated with said discharge means and said closure for positioning said discharge means and containing means for operating said closure, and slidable compensating means associated with said discharge means and of substantially the same diameter as said slidable means extending above the liquid level at all positions of said discharge means whereby the capacity of said chamber remains constant in filling regardless of the position of said discharge means.

10. In liquid dispensing apparatus, the combination of a measuring chamber, a discharge connection for said chamber, discharge means disposed in said chamber and cooperating with said connection, closure means for said means, drain means operable by said discharge connection for permitting return of liquid to the source, and means cooperating with said closure and operable by said discharge connection whereby said closure permits discharge of liquid from said measuring chamber.

11. In liquid dispensing apparatus, the combination of a measuring chamber, discharge connections therefor, discharge means for said chamber connected to said connections, said means including collapsible liquid conducting means having a normally closed draw-off device carried thereby, remotely operable closure means associated with said draw-off device, means for moving said discharge means to predetermined positions of discharge and operating said closure means to discharge liquid at said positions, said means being adapted to move said discharge means to inoperative position, drain means operable by said discharge connections to permit return of liquid to the source, means operable by said discharge connections in drain operating position for operating said closure means in discharge means inoperative position whereby liquid is permitted to drain to said source.

12. In liquid dispensing apparatus, the combination of a measuring chamber, means for supplying said chamber with the liquid to be dispensed, an overflow pipe draining back all liquid in excess of the highest predetermined quantity, an adjustable discharge conduit and a hose and nozzle connected to said conduit, means for adjusting said conduit to discharge predetermined quantities of liquid, a plurality of vertically positioned positive stops with which said conduit adjusting means cooperates, a drain receptacle connected to said overflow pipe and adapted to drain the contents of said chamber and means preventing draining through said receptacle except when said conduit adjusting means is below the lowest positive stop.

13. In liquid dispensing apparatus, the combination of a measuring chamber, means for supplying said chamber with the liquid to be dispensed, an overflow pipe draining back all liquid in excess of the highest predetermined quantity, an adjustable discharge conduit and a hose and nozzle connected to said conduit, means for adjusting said conduit to discharge predetermined quantities of liquid, a plurality of vertically positioned positive stops with which said conduit adjusting means cooperates, a drain receptacle and a valve in said receptacle connected to said overflow pipe and adapted to drain the contents of said chamber and means preventing draining through said receptacle except when said conduit adjusting means is below the lowest positive stop.

14. In liquid dispensing apparatus, the combination of a measuring chamber, means for supplying said chamber with the liquid to be dispensed, an overflow pipe draining back all liquid in excess of the highest predetermined quantity, an adjustable discharge conduit and a hose and nozzle connected to said conduit, means for adjusting said conduit to discharge predetermined quantities of liquid, a plurality of vertically positioned positive stops with which said conduit adjusting means cooperates, a drain receptacle connected to said overflow pipe and adapted to drain the contents of said chamber, a normally closed valve in said drain receptacle adapted to be opened by said hose nozzle and means preventing opening of said last named valve except when said conduit adjusting means is below the lowest positive stop.

15. In liquid dispensing apparatus, the combination of a measuring container, means for supplying said container with liquid to be dispensed, movable discharge means including a discharge valve in said container, said discharge means being movable to selected position to discharge selected amounts fixed said container, means operable externally of said container for controlling said discharge valve and discharge means, a drain device communicating with said container, a valve in said drain device, and means cooperating with said discharge valve and drain device for operating the valve in said drain device when said discharge valve is in normal inoperative position.

Signed at Rochester, Pennsylvania, this 31st day of January, 1928.

WILLIAM S. TOWNSEND.